No. 798,154. PATENTED AUG. 29, 1905.
J. S. BARNES.
FENCE LOOM.
APPLICATION FILED MAR. 24, 1904. RENEWED JULY 26, 1905.
8 SHEETS—SHEET 1.
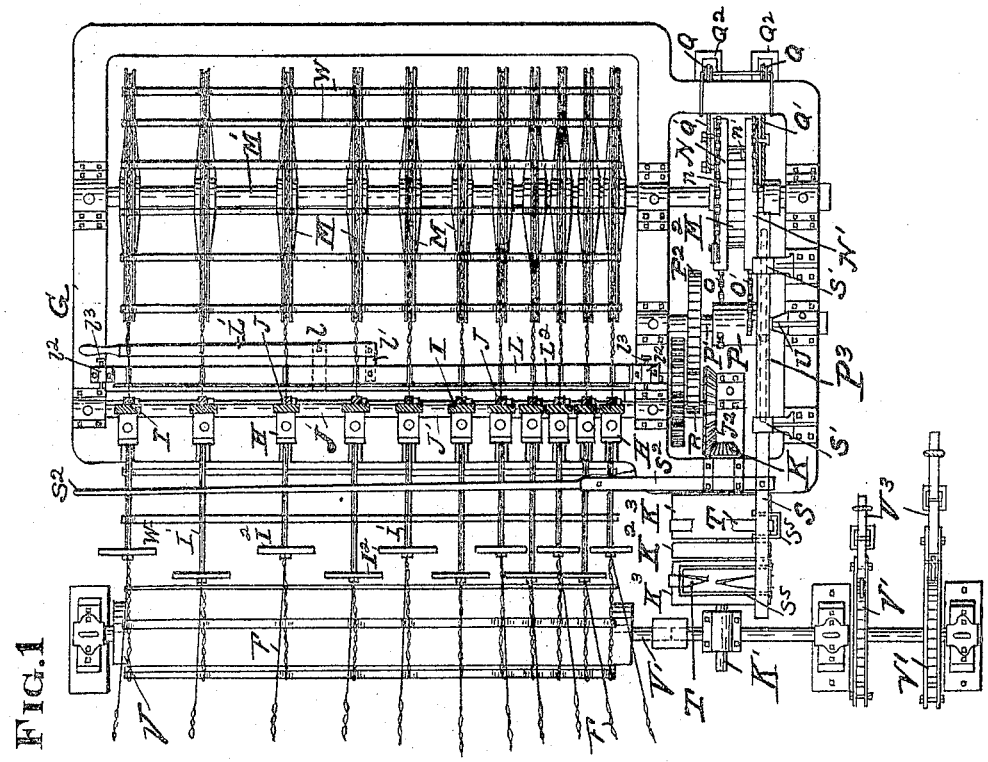
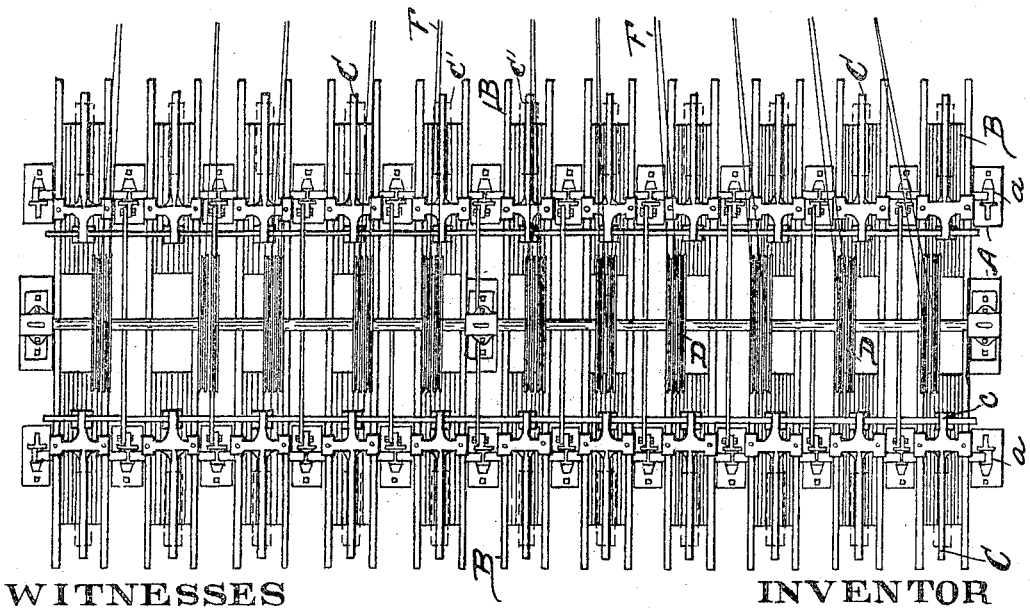
WITNESSES
J. L. Cameron
Chas Timm
INVENTOR
John S. Barnes
By Fisk & Thomas
ATTORNEYS

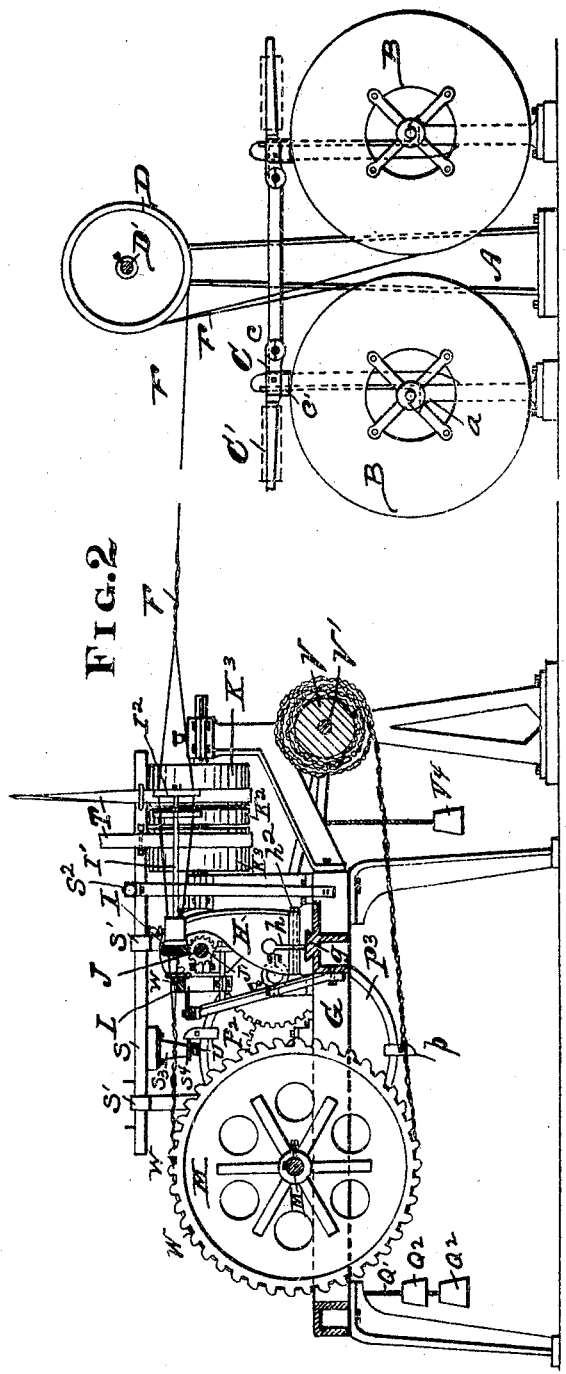

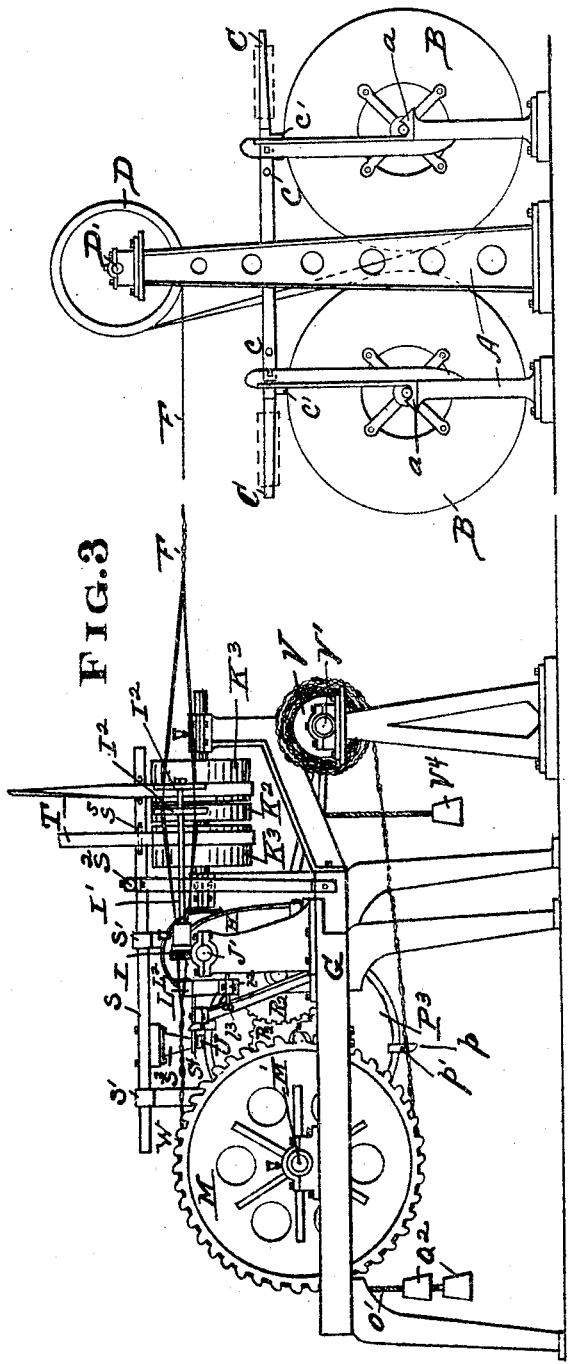

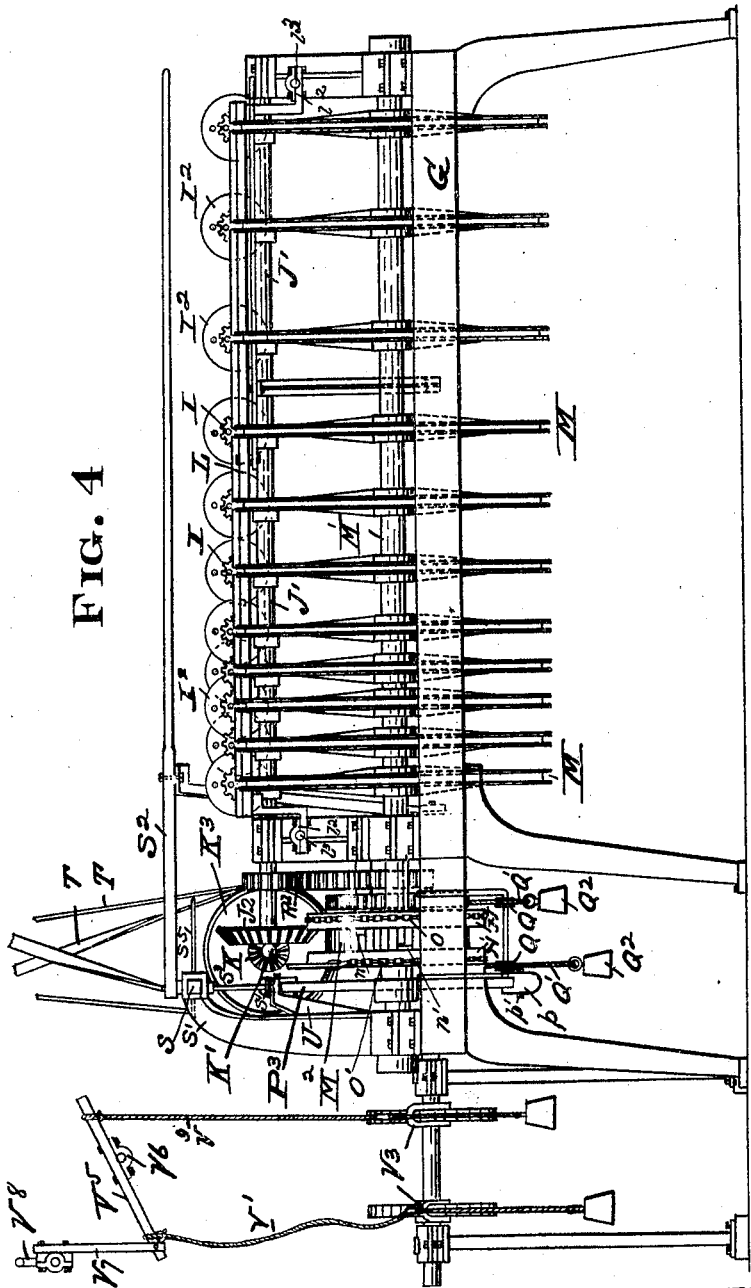

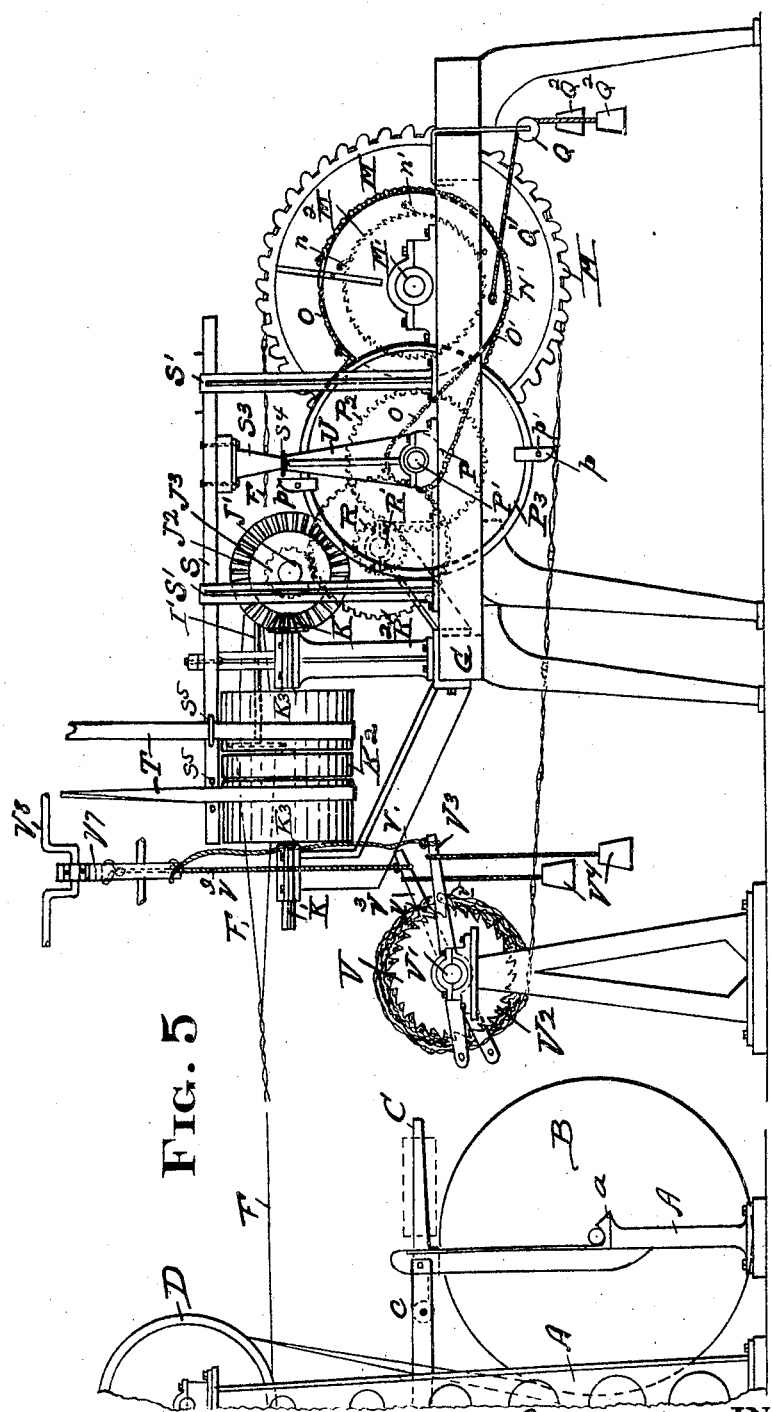

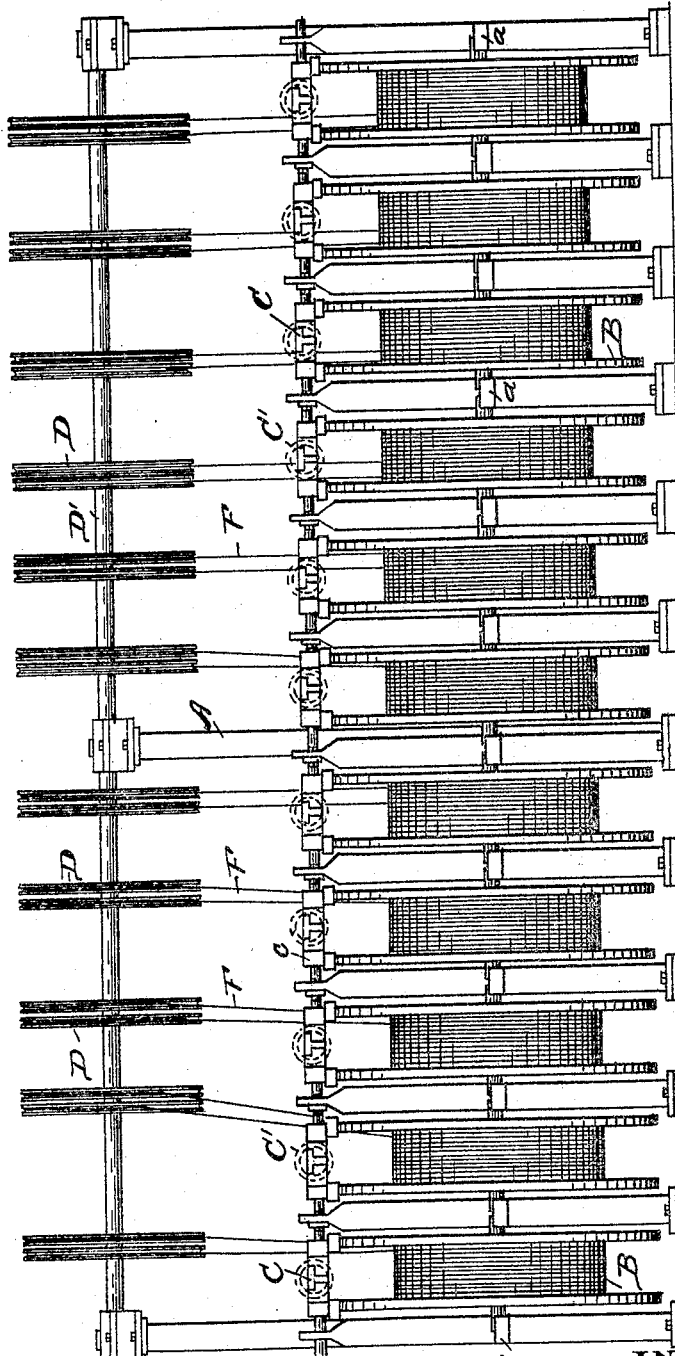

No. 798,154. PATENTED AUG. 29, 1905.
J. S. BARNES.
FENCE LOOM.
APPLICATION FILED MAR. 24, 1904. RENEWED JULY 26, 1905.
8 SHEETS—SHEET 7.
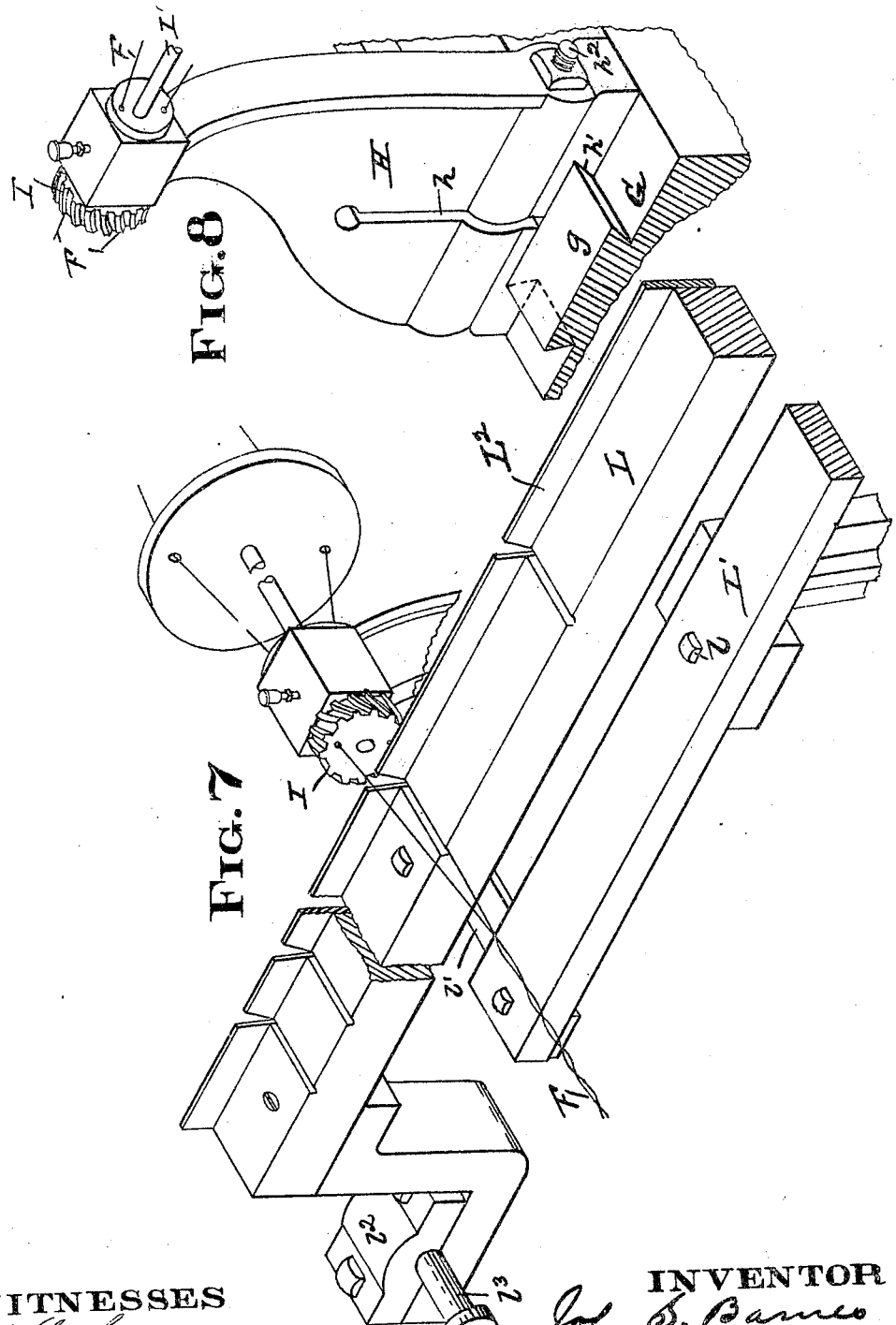
WITNESSES
INVENTOR
ATTORNEYS

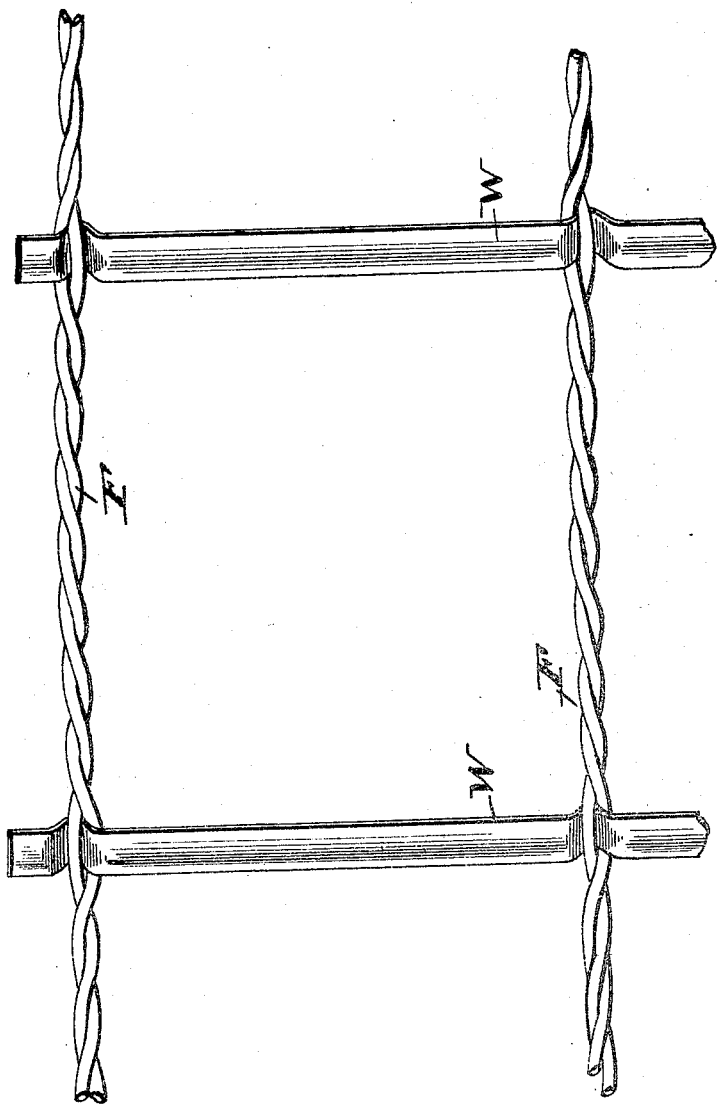

UNITED STATES PATENT OFFICE.

JOHN S. BARNES, OF DETROIT, MICHIGAN, ASSIGNOR TO THE MAJESTIC WIRE FENCE COMPANY, LIMITED, OF DETROIT, MICHIGAN, A CORPORATION.

FENCE-LOOM.

No. 798,154.     Specification of Letters Patent.     Patented Aug. 29, 1905.

Application filed March 24, 1904. Renewed July 26, 1905. Serial No. 271,389.

*To all whom it may concern:*

Be it known that I, JOHN S. BARNES, a citizen of the United States, residing at Detroit, county of Wayne, State of Michigan, have invented a certain new and useful Improvement in Fence-Looms; and I declare the following to be a full, clear, and exact description of the invention, such as will enable others skilled in the art to which it pertains to make and use the same, reference being had to the accompanying drawings, which form a part of this specification.

My invention relates to an improvement in fence-looms, shown in the accompanying drawings and more particularly set forth in the following specification and claims.

In the drawings, Figure 1 is a plan view of the loom and reel-frame. Fig. 2 is a longitudinal vertical sectional view of the loom, showing the reel-frame in elevation. Fig. 3 is a side elevation of the loom and reel-frame. Fig. 4 is an end elevation of the loom. Fig. 5 is a side elevation of the loom opposite that shown in Fig. 3, showing also a portion of the reel-frame. Fig. 6 is an end elevation of the reel-frame. Fig. 7 is a detail view in perspective of the sliding carriage, showing a portion of the lever operating the same. Fig. 8 is a detail view showing the means employed for adjusting the hanger supporting the twisting-gear with reference to the adjacent twisting-gears. Fig. 9 is a detail view showing the resultant fence fabric.

The object of my invention is to construct a loom designed to manufacture the wire fence shown in the patent issued to Barnes and Willmarth, January 19, 1904, No. 749,714, and also the patent issued to me on the 8th day of December, 1903, No. 746,441, and is designed more particularly as an improvement on the application of Willmarth and Barnes for improvement in fence-looms, filed September 14, 1903, Serial No. 173,105.

It will be seen that by comparing the present application with that just referred to that the construction of the loom is simplified and its efficiency greatly increased, the salient features of the improvement being apparent on further reference to the following specification and claims.

Referring to the letters of reference shown in the drawings, A is the reel-frame, and B B are the reels, provided with trunnions supported by the brackets $a$ in the reel-frame.

C denotes swinging arms, pivoted at $c$ to the reel-frame and provided with brake-shoes $c'$, bearing on the periphery of the reels.

$C'$ is a metallic sleeve (shown in dotted lines) supported by the arm C and serving as a weight to hold the brake-shoe in frictional contact with the periphery of the reels. This sleeve, which is essentially a section of piping, may be of any required length necessary to afford proper frictional contact of the brake-shoe.

D D are grooved pulleys mounted on the shaft $D'$, supported in the reel-frame A.

F denotes the lateral wires of the fence leading from the reels up and around the pulleys D and from thence to the loom proper.

G is the frame of the loom, and H denotes the hangers supporting the twisting-gears. These hangers are split at $h$ and are formed with a dovetail recess $h'$ to engage the dovetail $g$ on the frame of the machine.

$h^2$ is a bolt set in the hanger directly above the dovetail, and by screwing up the nut engaging the same the divided portion of the hanger is drawn together, tightening it upon the dovetail $g$. By loosening this bolt the hangers may be adjusted with reference to each other.

I denotes the twisting-gears, mounted in the hangers $h$ and provided with an extension-arm $I'$, having cross-arms or disks $I^2$, provided with apertures through which the strands of the lateral wires are threaded before passing through the apertures provided in the twisting-gears I.

J, Fig. 2, denotes driving-gears meshing with the twisting-gears I, mounted on the shaft $J'$, which in turn is driven by the bevel-gear $J^2$, meshing with a similar gear K on the driving-shaft $K'$.

$K^2$ is a driving-pulley, and $K^3$ $K^3$ are loose pulleys mounted on the driving-shaft $K'$.

L is a sliding carriage having a reciprocating movement and is operated manually by the lever $L'$, fulcrumed at $l$ to a bracket secured to the frame and connected with the carriage by a link $l'$. The carriage is provided at each end with sleeves $l^2$, embracing the rods $l^3$, secured to the frame. These rods are provided with suitable stops to limit the movement of the carriage in one direction, while the frame of the machine, to which the rods are secured, limits the movement of the carriage in the opposite direction.

$L^2$ is an upstanding flange secured to the carriage and provided with notches through which the strands of the lateral wires pass.

M M are a series of notched wheels keyed to the shaft M', supported in suitable bearings in the frame.

$M^2$ is a ratchet-wheel keyed to the shaft M'.

N and N' are drums sleeved on the shaft M' and are provided with dogs $n$ and $n'$, engaging the ratchet-wheel $M^2$.

O and O' are chains secured at one end to the drums N and N', the other ends of the chains being engaged with the drum P, mounted on the shaft P', one of the chains being passed over the drum and secured, while the other passes under the drum P, to which it is secured.

Q Q are pulleys mounted in a suitable hanger hung from the frame, and Q' Q' are cables, one end of each being secured to the drums N and N', the other ends of the cables being provided with counterpoise-weights $Q^2 Q^2$.

$P^2$ is a gear-wheel mounted on the shaft P', meshing with the pinion R, mounted on the shaft R'.

$R^2$ is a gear-wheel mounted on the shaft R', meshing with the pinion $J^3$, mounted on the shaft J'.

$P^3$ is a disk mounted on the shaft P' and provided with adjustable stops $p$, secured to the rim and projecting beyond the periphery of the disk.

$p'$ is a bolt, by tightening which the stops are secured to the rim.

S is a belt-shifting bar supported in suitable standards S', through which it reciprocates.

$S^2$ is a lever engaging the bar S and by which it is manually operated.

$S^5$ is the usual yoke engaging the belts T.

$S^3$ is a depending arm secured to the shifting-bar S and provided with a projecting arm $S^4$, engaged by the stops $p$ during the rotation of the disk $P^3$.

U is an arm rising from the bearing supporting the shaft P' and acting as a stop to limit the further movement of the disk $P^3$ when the stop $p$ comes in abutting contact when rotating in either direction, the stop serving, when brought in contact with the projecting arm $S^4$, to move the driving-belts onto the loose pulleys, the fixed arm U impeding the further rotation of the disk $P^3$ and insuring the passage of the belt from the tight to the loose pulley.

V is a drum mounted on the shaft V', mounted in suitable hangers and supported by a suitable frame.

$V^2$ denotes ratchet-wheels mounted on the shaft V'.

$V^3$ denotes arms pivoted on the shaft V' and provided with dogs $v$, engaging the teeth of the ratchet-wheels $V^2$.

$V^4$ denotes weights suspended from the arms $V^3$.

$V^5$ is a rocking arm supported on the shaft $V^6$ and operated by the pitman $V^7$ engaging the crank-arm on the shaft $V^8$.

$v'$ is a cable engaging one arm of the rocking arm $V^5$, the other end being secured to the arm $V^3$. $V^9$ is a similar cable secured to the rocking arm $V^5$, the other arm being engaged with the arm $V^3$.

The operation of my invention will now be described: Wire to form the strands of the lateral cables having been wound on the reels, the reels are set in position in the reel-frame A. The brakes C are then brought into position, so that the brake-shoes engage the periphery of the reels. Strands of wire are now threaded once around the grooved pulleys D, through the cross-arms or disks $I^2$, through the apertures provided in the twisting-gears I, and out through the notches and grooves of the sliding carriage. They are then given a slight twist manually and engaged with a bar set into the alined notches of the wheels M, the wires being carried around the wheels M and secured to the winding-drum V. The picket W is then inserted through the open loops of the strands of the lateral cables directly back of the upturned portion $L^2$ of the sliding carriage L, the carriage and its upturned flange serving as a guide to direct the picket through the open loops. By a manual operation of the lever L' the carriage is caused to move forward, forcing the picket just inserted snugly into the crotch formed by the strands of the lateral cables. The belt-shifting lever $S^2$ is then operated, moving one of the belts T onto the tight pulley, thereby starting the twisting-gears and at the same time causing the notched wheels M to rotate, by means of which the fence is drawn forward and the wire fed to and through the twisting-gears. As the fence is delivered from the notched wheels M it passes onto the winding-drum V, operated by the movement of the rocking arms $V^3$, on which are mounted the dogs engaging the ratchet-wheels $V^2$. This winding-drum bundles the product as rapidly as the fence is made. When the predetermined distance between pickets is reached, governed by the location of the stops $p$ with relation to each other and the belt-shifting mechanism, the belt on the tight pulley is moved over onto the loose pulley by the stop coming in contact with the projecting arm $S^4$, secured to the end of the depending arm $S^3$. In moving the belt-shifting mechanism the stop $p$ forces the same forward until it comes in contact with the upstanding arm U, which brings the rotating gears to a positive stop with the apertures through which the line-wires are fed in a vertical plane in order to insure the open loops of the strands forming the line-wires being in the same plane with each other to provide for the ready insertion of the picket. The loom having twisted the strands forming the lateral cables the required distance between pickets and the twisting-gears having been brought to a stop, as before explained, by the shifting of the driving-belt from the driving onto the loose pulleys, another picket is inserted and the lever controlling the belt-shifting mechanism is again manually operated, this time in the opposite direction, shifting the other driving-belt T onto the driving-pulley, thereby reversing the twist given to the strands of the lateral cables every alternate picket. It will be noted that there can be no confusion in the operator's mind as to which driving-belt is to be moved onto the driving-pulley, as one or the other stops $p$ will alternately abut the projecting arm $S^4$, and the belt-shifting lever can therefore be only moved away from the stop. It will be noted that while the belts T T are driven from the same line-shaft one of the belts is crossed, so as to reverse the motion given to the twisting-gears.

Referring again to the notched wheels M engaging the fence-pickets, by means of which the wire and fence is drawn forward ready to deliver to the winding-drum V, it will be noted that while the notched wheel is driven from the shaft J' the rotation of the latter is reversed after the insertion of each picket, while, as before stated, the notched wheel M travels in one direction only. This is accomplished through the application of the chains O and O', the ends of which are engaged to the drums N and N', while the other ends of the chains are secured to the drum P, one end of one of the chains being wound around the drum P in one direction, while the other passes around the drum in the opposite direction to which it is also secured. It will therefore be understood that whichever way the shaft P' is rotated that either the chain O or O' will be wound around the drum P, causing either the drum N or N', as the case may be, to rotate, and the dogs secured to the operating-drum to engage the ratchet-wheel $M^2$, thereby rotating the notched wheels M. It will also be seen that while one of the chains O or O' engages the drum N to cause the wheels M to rotate the other chain will slacken and the counterpoise-weight engaged with the drum to which the slack chain is secured will cause the drum to reverse its movement to a point where it is ready to engage the ratchet-wheel when the twisting-gears are reversed after the insertion of the new picket.

The notched wheels M are provided with a double row of teeth forming a channel between the teeth to receive the lateral cables holding them against displacement while the teeth engaging the picket draw the wires through the twisting-gears.

Having thus described my invention, what I claim is—

1. In a fence-loom, a plurality of laterally-adjustable twisting-gears, a corresponding plurality of notched wheels, the teeth of which are adapted to engage the fence-pickets by means of which the strands of the fence forming the longitudinal cables are drawn through the twisting-gears, and the twisting-gears for twisting the wires around and between the pickets to form the longitudinal cables, substantially as described.

2. In a wire-fence loom, a plurality of notched wheels formed with a double row of teeth having a channel between the teeth to receive the cables while the teeth engage the pickets whereby the lateral wires forming the cables are drawn through the twisting-gears, the twisting-gears, and means for driving said notched wheels, substantially as described.

3. In a wire-fence loom, a series of laterally-adjustable twisting-gears provided with apertures through which the strand-wires forming the longitudinal cables pass, a plurality of laterally-adjustable notched wheels corresponding in number with the twisting-gears, and a winding-drum to receive the fence as it is delivered from the notched wheels, substantially as described.

4. In a wire-fence loom, a series of twisting-gears for twisting the strands forming the lateral cables, a corresponding number of notched wheels adapted to receive between their teeth the pickets of the fence, a winding-drum to receive and bundle the fence as it is delivered from the notched wheels, said winding-drum provided with ratchet-wheels secured to the shaft of the winding-drum, weighted rocking arms provided with dogs to engage said ratchet-wheels, and means for alternately operating said rocking arms to rotate the drum and wind the fence upon it, substantially as described.

5. In a wire-fence loom, a series of twisting-gears for twisting the strands forming the lateral cables, means for reversing the rotation of said twisting-gears after the insertion of each picket, a plurality of notched wheels, corresponding in number with the twisting-gears and designed to receive the fence-pickets and draw the lateral wires through the twisting-gears, a series of gears designed to drive the twisting-gears mounted on a suitable shaft and means operated by said shaft for rotating the notched wheels in one direction only, substantially as described.

6. In a wire-fence loom, a plurality of twisting-gears provided with apertures through which the strands forming the lateral cables are threaded, a plurality of notched wheels corresponding in number with the twisting-gears keyed to a suitable shaft, a ratchet-wheel mounted on said shaft, winding-drums sleeved on said shaft and provided with dogs to engage said ratchet-wheel, a pinion mounted on the shaft of the twisting-gears, a drum P suitably mounted and driven by a train of gears from the pinion mounted on the shaft of the twisting-gears, a strap or chain connection between the drums mounted on the shaft of the notched wheel and the drum P, the ends of each of the chains being secured to each of the drums on the notched-wheel shaft the other end of the chain being secured to the drum P, one chain being wrapped around the under side of the drum and secured thereto, and the other wrapped around the drum from the upper side and engaged thereto, and means for taking up the slack in either chain and returning the drums to their initial position as they are alternately operated to rotate said notched wheels, substantially as described.

7. In a wire-fence loom, a plurality of twisting-gears, a corresponding number of gears meshing with said twisting-gears mounted on a single shaft, a driving-shaft provided with tight and loose pulleys geared with said last-named shaft, a belt-shifting mechanism to move the driving-belts onto the tight and loose pulleys alternately, and adjustable means for operating said belt-shifting mechanism, substantially as described.

8. In a wire-fence loom, a plurality of twisting-gears, hangers for supporting the said twisting-gears provided with a dovetail recess to receive a corresponding dovetail portion of the frame, the frame provided with a dovetail portion to enter the recess in said hangers, and means for securing the hangers to the frame when adjusted, substantially as described.

9. In a wire-fence loom, a plurality of twisting-gears, hangers for supporting said gears provided with a divided section and a channel to receive a complementary projecting portion of the frame, the frame provided with an offset portion designed to enter the channel in the hangers, and bolts engaging the divided portions of the hangers to draw the sections together to secure the hangers to the frame, substantially as described.

10. In a wire-fence loom, a plurality of twisting-gears, means for driving the gears, means for alternately reversing the movement of said gears, means for throwing the latter into and out of operation consisting of a disk suitably mounted and driven, and adjustable stops $p$ mounted on said disk to govern the means controlling the alternate movement of the twisting-gears, substantially as described.

11. In a wire-fence loom, a frame, a plurality of reels provided with trunnions to support them in the frame, arms hinged to the frame and adapted to bear on the periphery of the reels, and weighted sleeves mounted on said arms to increase the frictional contact between the arms and the reels, substantially as described.

12. In a wire-fence loom, a series of twisting-gears for twisting together the strands forming the lateral cables, a sliding carriage provided with an upturned portion notched to permit the passage of the strand-wires, said carriage suitably mounted and provided with means to limit its movement, and an operating-lever for manually controlling the movement of the carriage in either direction, substantially as described.

13. In a wire-fence loom, a plurality of twisting-gears, a sliding carriage provided with an upturned flange to engage the picket, said upturned flange and carriage notched to permit the passage of the wires from the twisting-gears, guide-rods provided with a stop at one end and secured in the frame at the other, sleeves bolted to the said sliding carriage and embracing said guide-rods, substantially as described.

In testimony whereof I sign this specification in the presence of two witnesses.

JOHN S. BARNES.

Witnesses:
S. E. THOMAS,
CHAS. TIMM.